(12) United States Patent
Sakurai et al.

(10) Patent No.: US 10,246,340 B2
(45) Date of Patent: Apr. 2, 2019

(54) AMMONIA SYNTHESIS SYSTEM AND METHOD

(71) Applicant: MITSUBISHI HEAVY INDUSTRIES, LTD., Tokyo (JP)

(72) Inventors: Mikiya Sakurai, Tokyo (JP); Yukio Tanaka, Tokyo (JP); Naoya Okuzumi, Tokyo (JP); Hiroyuki Osora, Tokyo (JP); Haruaki Hirayama, Tokyo (JP)

(73) Assignee: MITSUBISHI HEAVY INDUSTRIES ENGINEERING, LTD., Kanagawa (JP)

( * ) Notice: Subject to any disclaimer, the term of this patent is extended or adjusted under 35 U.S.C. 154(b) by 0 days.

(21) Appl. No.: 15/507,379

(22) PCT Filed: Apr. 21, 2015

(86) PCT No.: PCT/JP2015/062098
§ 371 (c)(1),
(2) Date: Feb. 28, 2017

(87) PCT Pub. No.: WO2016/035376
PCT Pub. Date: Mar. 10, 2016

(65) Prior Publication Data
US 2017/0283271 A1    Oct. 5, 2017

(30) Foreign Application Priority Data

Sep. 5, 2014    (JP) .................................. 2014-181614

(51) Int. Cl.
*C07C 1/02*    (2006.01)
*C01C 1/04*    (2006.01)
(Continued)

(52) U.S. Cl.
CPC ............ *C01C 1/047* (2013.01); *B01D 53/002* (2013.01); *B01J 23/462* (2013.01); *C01C 1/02* (2013.01);
(Continued)

(58) Field of Classification Search
CPC .... C01C 1/00; C01C 1/02; C01C 1/04; C01C 1/0405; C01C 1/0458; C01C 1/047;
(Continued)

(56) References Cited

U.S. PATENT DOCUMENTS 4,568,530 A    2/1986   Mandelik et al.
4,624,841 A    11/1986  Hidaki
(Continued)

FOREIGN PATENT DOCUMENTS

EP    1 391 428 A1    2/2004
EP    1 661 860 A1    5/2006
(Continued)

OTHER PUBLICATIONS

Extended (supplementary) European Search Report dated Jul. 10, 2017, issued in counterpart European Application No. 15837863.8. (7 pages).
(Continued)

*Primary Examiner* — Natasha E Young
(74) *Attorney, Agent, or Firm* — Westerman, Hattori, Daniels & Adrian, LLP

(57) ABSTRACT

Included are an ammonia synthesis column that synthesizes ammonia from a raw material gas, a discharge line that discharges a synthetic gas, a water-cooled cooler that cools the synthetic gas with a coolant, disposed in the discharge line, an ammonia separator into which a synthetic gas after cooling is introduced and which separates the ammonia gas and a liquid ammonia from each other, a raw material return line that returns a raw material gas containing the separated
(Continued)

ammonia gas to the ammonia synthesis column side as a return raw material gas, and a compressor that compresses the return raw material gas, disposed in the raw material return line. An ammonia concentration in the return raw material gas is 5 mol % or more, and an ammonia synthesis catalyst that synthesizes the ammonia gas in the ammonia synthesis column is a ruthenium catalyst.

2 Claims, 3 Drawing Sheets

(51) Int. Cl.
| | | |
|---|---|---|
| *B01D 53/00* | (2006.01) | |
| *C09K 5/04* | (2006.01) | |
| *F25B 9/00* | (2006.01) | |
| *B01J 23/16* | (2006.01) | |
| *B01J 23/58* | (2006.01) | |
| *B01J 23/63* | (2006.01) | |
| *C01C 1/02* | (2006.01) | |
| *B01J 23/46* | (2006.01) | |

(52) U.S. Cl.
CPC .............. *C01C 1/0411* (2013.01); *C09K 5/04* (2013.01); *F25B 9/002* (2013.01); *B01J 23/58* (2013.01); *B01J 23/63* (2013.01); *Y02P 20/52* (2015.11)

(58) Field of Classification Search
CPC .... C09K 5/00–5/04; F25B 9/00–9/002; B01D 53/00–53/002; B01J 19/00; B01J 19/24
See application file for complete search history.

(56) References Cited

U.S. PATENT DOCUMENTS

| | | | |
|---|---|---|---|
| 6,171,570 B1 | 1/2001 | Czuppon | |
| 7,025,944 B2* | 4/2006 | Nielsen | ................ B01J 23/462 |
| | | | 423/362 |
| 2004/0057891 A1 | 3/2004 | Nielsen et al. | |
| 2006/0099131 A1 | 5/2006 | Singh et al. | |

FOREIGN PATENT DOCUMENTS

| | | |
|---|---|---|
| JP | 61-106403 A | 5/1986 |
| JP | 11-304283 A | 11/1999 |
| JP | 2003-20221 A | 1/2003 |
| JP | 2004-35399 A | 2/2004 |
| JP | 2006-131493 A | 5/2006 |
| WO | 2014/129256 A1 | 8/2014 |

OTHER PUBLICATIONS

Translation of Written Opinion dated Aug. 4, 2015, issued in counterpart International Application No. PCT/JP2015/062098. ( 4 pages).
International Search Report dated Aug. 4, 2015, issued in counterpart International Application No. PCT/JP2015/062098 (2 pages).
Written Opinion in Japanese dated Aug. 4, 2015, issued in counterpart International Application No. PCT/JP2015/062098 (3 pages).

* cited by examiner

AMMONIA SYNTHESIS SYSTEM AND METHOD

This application is a U.S. national stage application of International Patent Application No. PCT/JP2015/062098 filed on Apr. 21, 2015 and published as WO 2016/035376 on Mar. 10, 2016, which claims priority to Japanese Patent Application No. JP 2014-181614, filed on Sep. 5, 2014, the entire contents of which are hereby incorporated by reference.

FIELD

The present invention relates to an ammonia synthesis system and method capable of improving an operating efficiency of ammonia synthesis.

BACKGROUND

In a conventional ammonia synthesis process, for example, by using a natural gas, ammonia ($NH_3$) is synthesized from hydrogen ($H_2$) and nitrogen ($N_2$) as raw materials in an ammonia synthesis column. In this ammonia synthesis, when ammonia is separated from a synthetic gas in an ammonia synthesis loop, and a product ammonia is taken out as a liquid, a cooling process using a chiller refrigerant is used in general.

Conventionally, as a process using this refrigerant, for example, a part of the product ammonia extracted from the ammonia synthesis loop has been used as a chiller refrigerant, and has been used for cooling in the ammonia synthesis loop. The refrigerant (gas ammonia) after being used for cooling (after heat exchange) is compressed again, cooled, and liquified again to be circulated and used (Patent Literatures 1 and 2).

CITATION LIST

Patent literature

Patent Literature 1: Japanese Laid-open Patent Publication No. 61-106403
Patent Literature 2: Japanese Laid-open Patent Publication No. 11-304283

SUMMARY

Technical Problem

However, when the product ammonia is used as a chiller refrigerant, power to compress or cool the chiller refrigerant is large, and large-scale equipment is required. Therefore, cost of an ammonia synthesis plant and operating cost thereof are significantly increased disadvantageously.

Therefore, realizing an ammonia synthesis system and method capable of reducing refrigerant manufacturing cost without using a product ammonia as a chiller refrigerant and improving an operating efficiency of ammonia synthesis has been desired.

In view of the above problems, an object of the present invention is to provide an ammonia synthesis system and method capable of reducing refrigerant manufacturing cost without using a product ammonia as a chiller refrigerant and improving an operating efficiency of ammonia synthesis.

Solution to Problem

In order to solve the problem, the first embodiment of the invention is an ammonia synthesis system including an ammonia synthesis column that synthesizes an ammonia gas from a raw material gas for ammonia synthesis, a discharge line that discharges a synthetic gas containing the ammonia gas obtained from the ammonia synthesis column and an unreacted raw material gas, a water-cooled or air-cooled cooler that water-cools or air-cools the synthetic gas, disposed in the discharge line, an ammonia separator to which the discharge line is connected, into which the synthetic gas after cooling is introduced, and which separates the ammonia gas and a liquid ammonia from each other, a raw material return line that returns a raw material gas containing the ammonia gas separated by the ammonia separator to the ammonia synthesis column side as a return raw material gas, and a compressor that compresses the return raw material gas, disposed in the raw material return line, wherein an ammonia concentration in the return raw material gas to be introduced into the ammonia synthesis column is 5 mol % or more, and an ammonia synthesis catalyst that synthesizes the ammonia gas in the ammonia synthesis column is a ruthenium catalyst.

The second embodiment is the ammonia synthesis system according to the first embodiment, wherein the temperature of the synthetic gas after water-cooling to be introduced into the ammonia separator is from 30 to 50° C.

The third embodiment is an ammonia synthesis method including an ammonia synthesis step of synthesizing an ammonia gas from a raw material gas for ammonia synthesis, a water-cooled or air-cooled cooling step of water-cooling or air-cooling a synthetic gas containing the obtained ammonia gas and an unreacted raw material gas, an ammonia separation step of separating the synthetic gas after cooling into the ammonia gas and a liquid ammonia, and a compression step of compressing a return raw material gas when the raw material gas containing the separated ammonia gas is returned to the ammonia synthesis step side as the return raw material gas, wherein an ammonia concentration in the return raw material gas to be introduced into the ammonia synthesis step is 5 mol % or more, and an ammonia synthesis catalyst that synthesizes the ammonia gas is a ruthenium catalyst.

The fourth embodiment is the ammonia synthesis method according to the third embodiment, wherein the temperature of the synthetic gas after cooling is from 30 to 50° C.

Advantageous Effects of Invention

According to the present invention, an operating efficiency of ammonia synthesis can be improved without using a product ammonia as a chiller refrigerant unlike conventional art.

DESCRIPTION OF EMBODIMENTS

Hereinafter, preferred examples of the present invention will be described in detail with reference to the attached drawings. The present invention is not limited by the examples. When there is a plurality of examples, combination of the examples may also be included.

EXAMPLE

Figure 1:
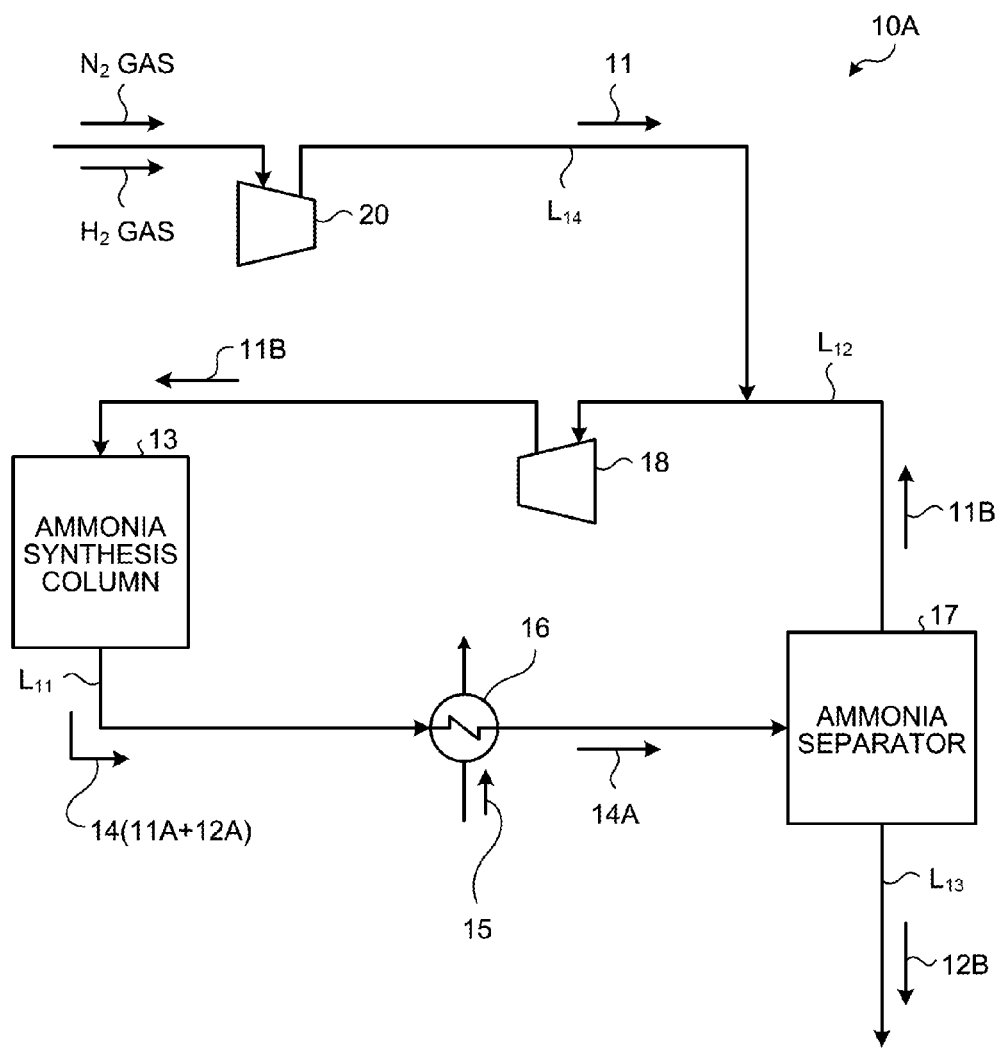
FIG. 1 is a schematic diagram of an ammonia synthesis system according to a first example.
Figure 2:
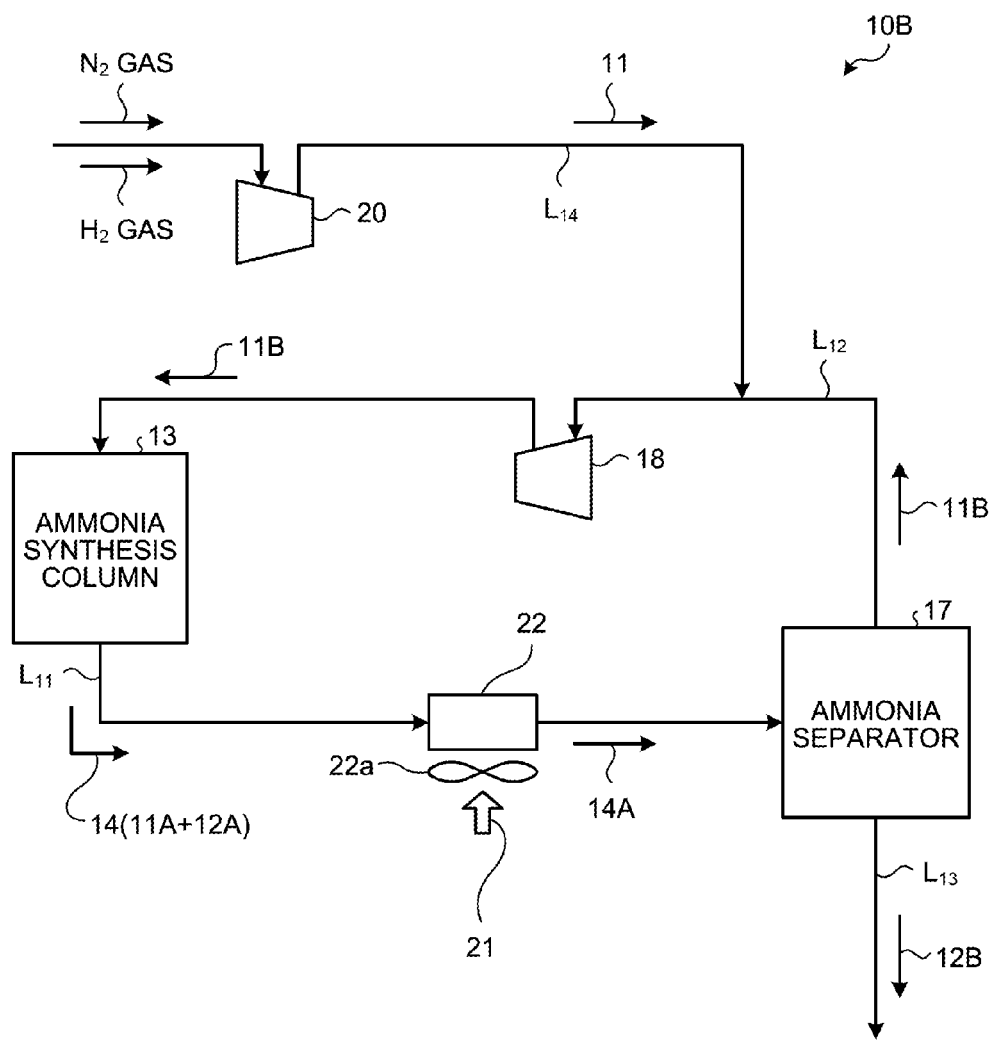
FIG. 2 is a schematic diagram of another ammonia synthesis system according to an example.

FIG. 1 is a schematic diagram of an ammonia synthesis system according to an example. FIG. 2 is a schematic diagram of another ammonia synthesis system according to the example.

As illustrated in FIG. 1, an ammonia synthesis system 10A according to the present example includes an ammonia synthesis column 13 that synthesizes an ammonia gas 12A from a raw material gas (hydrogen ($H_2$) and nitrogen ($N_2$)) 11 for ammonia synthesis, a discharge line $L_{11}$ that discharges a synthetic gas 14 containing the ammonia gas 12A obtained from the ammonia synthesis column 13 and an unreacted raw material gas 11A, a water-cooled cooler 16 that cools the synthetic gas 14 with a coolant 15, disposed in the discharge line $L_{11}$, an ammonia separator 17 to which the discharge line $L_{11}$ is connected, into which a synthetic gas 14A after cooling is introduced and which separates the ammonia gas 12A and a liquid ammonia 12B from each other, a raw material return line $L_{12}$ that returns a raw material gas containing the ammonia gas 12A separated by the ammonia separator 17 to the ammonia synthesis column 13 side as a return raw material gas 11B, and a compressor 18 that compresses the return raw material gas 11B, disposed in the raw material return line $L_{12}$. An ammonia concentration in the return raw material gas 11B to be introduced into the ammonia synthesis column 13 is 5 mol % or more, and an ammonia synthesis catalyst that synthesizes the ammonia gas 12A in the ammonia synthesis column 13 is a ruthenium catalyst.

The ammonia synthesis system 10A according to the present example is constituted by connecting the ammonia synthesis column 13 containing an ammonia synthesis catalyst to the ammonia separator 17 using the discharge lines $L_{11}$ and the raw material return line $L_{12}$ to form an ammonia synthesis system circulation loop.

The ammonia synthesis column 13 synthesizes an ammonia gas from a raw material gas 11 (and the return raw material gas 11B) with an ammonia synthesis catalyst.

As the ammonia synthesis catalyst used in the ammonia synthesis column 13, a ruthenium (Ru) catalyst is used.

Here, the ruthenium catalyst means a catalyst containing 0.1 wt % or more of ruthenium, and preferably contains, in addition to ruthenium as a main component, a promoter of at least one element selected from the group consisting of an alkali metal (for example, sodium (Na), potassium (K), rubidium (Rb), or cesium (Cs)), an alkaline earth metal (for example, magnesium (Mg), calcium (Ca), strontium (Sr), or barium (Ba)), and a rare earth element (from lanthanum of the element number 57 to lutetium of the element number 71).

Examples of the alkali metal as a promoter include sodium (Na), potassium (K), rubidium (Rb), and cesium (Cs). Examples of the alkaline earth metal include magnesium (Mg), calcium (Ca), strontium (Sr), and barium (Ba). Examples of the rare earth element include lanthanum of the element number 57 to lutetium of the element number 71.

A relationship among a synthesis pressure, a cooling temperature, and a synthesis temperature preferably has a relationship of "ammonia equilibrium concentration at outlet of ammonia synthesis column×operating pressure">"ammonia partial pressure at inlet of ammonia synthesis column". Specifically, the pressure is preferably in a range of 7 to 25 MPa, and more preferably in a range of 10 to 20 MPa.

As ammonia synthesis conditions in the ammonia synthesis column 13, the synthesis reaction temperature is preferably in a range of 200° C. to 600° C. A $H_2/N_2$ ratio is preferably in a range of 1 mol/mol to 5 mol/mol. The cooling temperature is in a range of 30° C. to 50° C. as described below.

In the ammonia synthesis column 13, the ammonia gas 12A is synthesized from the raw material gas 11 with an ammonia synthesis catalyst, and is discharged as the synthetic gas 14 from the ammonia synthesis column 13 through the discharge line $L_{11}$. The ammonia gas 12A and the unreacted raw material gas 11A are mixed in the synthetic gas 14.

The water-cooled cooler 16 water-cools the synthetic gas 14 synthesized in the ammonia synthesis column 13 with the coolant 15. Here, the coolant 15 has a temperature width in summer and winter, but the temperature of the synthetic gas 14A after cooling is about from 30 to 50° C.

Here, an air-cooled cooler 22 as illustrated in FIG. 2 may be used in place of cooling with the water-cooled cooler 16.

In an ammonia synthesis system 10B according to the present example illustrated in FIG. 2, the air-cooled cooler 22 that cools the synthetic gas 14 is disposed in the discharge line $L_{11}$ that discharges the synthetic gas 14 from the ammonia synthesis column 13. The air-cooled cooler 22 air-cools the synthetic gas 14 passing therethrough by introducing air 21 thereinto with a fan 22a.

The air 21 has a temperature width in summer and winter, but the temperature of the synthetic gas 14A after cooling is about from 30 to 50° C.

The ammonia separator 17 separates the ammonia in the synthetic gas 14A after water-cooling or air-cooling into the ammonia gas 12A and the liquid ammonia 12B, and performs gas-liquid separation, for example, by a vapor-liquid separating drum.

The liquid ammonia 12B which has been subjected to gas-liquid separation by the ammonia separator 17 is separately recovered as a product ammonia by a product ammonia line $L_{13}$. On the other hand, the ammonia gas 12A and the unreacted raw material gas 11A are returned as the return raw material gas 11B to the ammonia synthesis column 13 side by the raw material return line $L_{12}$.

The return raw material gas 11B is compressed to a predetermined pressure set for ammonia synthesis by the compressor 18 disposed in the raw material return line $L_{12}$.

A make-up gas line $L_{14}$ that introduces the raw material gas 11 as a make-up gas is connected to the raw material return line $L_{12}$ so as to be joined with the raw material return line $L_{12}$ prior to the compressor 18 between the ammonia separator 17 and the ammonia synthesis column 13 so as to obtain a predetermined synthesis concentration. A compressor 20 that compresses the raw material gas 11 newly supplied is disposed in the make-up gas line $L_{14}$.

Conventionally, in order to improve a separation efficiency of the liquid ammonia 12B in the ammonia separator 17, the synthetic gas 14 introduced into the ammonia separator 17 has been cooled to 10° C. or lower with a refrigerant (for example, ammonia refrigerant).

On the other hand, in the present invention, cooling is performed only with the coolant 15 or the air 21 without using any refrigerant, and the temperature of the synthetic gas 14A after cooling is set to about 30 to 50° C. Therefore, the return raw material gas 11B in the ammonia separator 17 that separates the liquid ammonia 12B contains a large amount of the ammonia gas 12A.

As a result, the ammonia concentration in the return raw material gas 11B to be introduced into the ammonia synthesis column 13 is 5 mol % or more, or more (for example, 10 mol % or more) according to temperature and pressure conditions.

Figure 3:
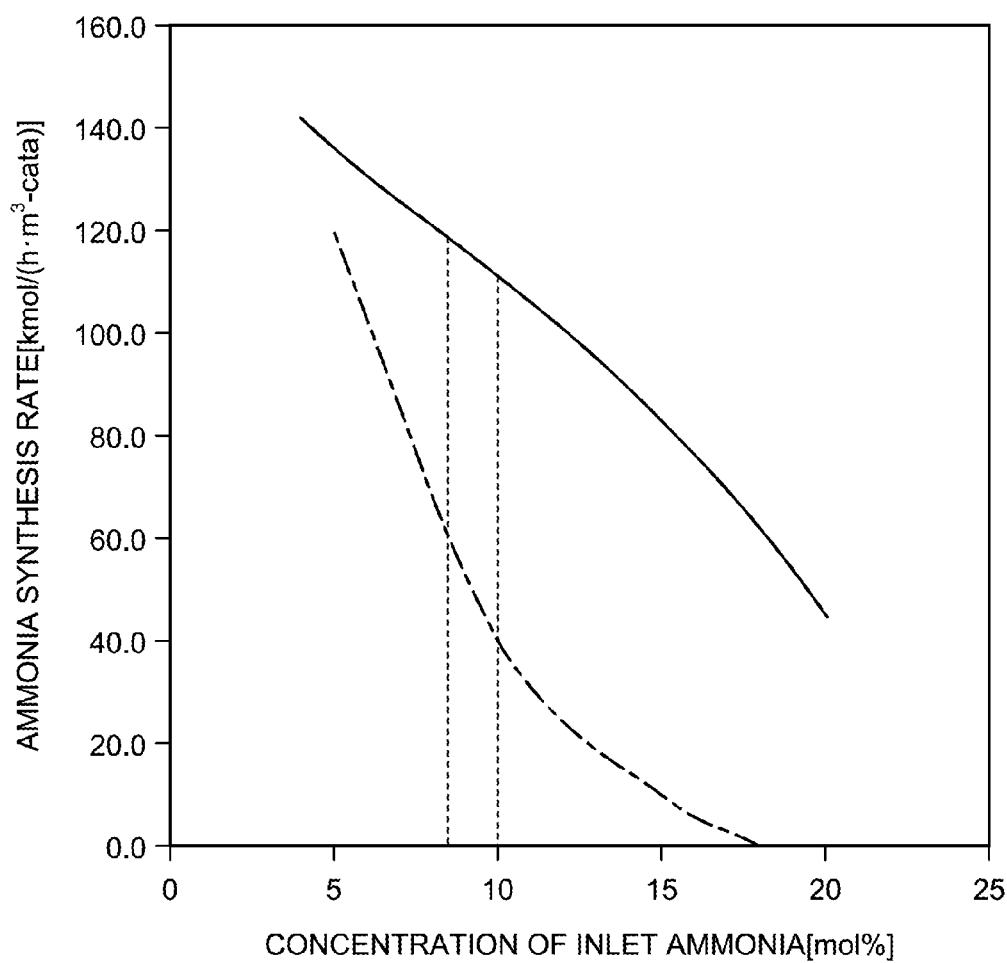
FIG. 3 is a diagram illustrating a relationship between an inlet ammonia concentration (mol %) introduced into an ammonia synthesis column and an ammonia synthesis rate ($kmol/(h \cdot m^3)$).

FIG. 3 is a diagram illustrating a relationship between an inlet ammonia concentration (mol %) introduced into the ammonia synthesis column 13 and an ammonia synthesis rate (kmol/(h·m$^3$)).

In FIG. 3, the solid line indicates a ruthenium (Ru) catalyst, and the one dot chain line indicates an iron (Fe) catalyst.

As synthetic conditions of this test, a $H_2/N_2$ ratio was set to 3, a pressure was set to 13.8 MPa, and a temperature was set to 430° C.

As apparent from FIG. 3, when the concentration of the iron catalyst exceeded 5 mol %, the synthesis rate was immediately reduced. However, it has been found that the ruthenium catalyst is highly active even with a high concentration of ammonia (for example, 10 to 15 mol %), and such a large reduction as in the iron catalyst was not observed.

Therefore, the conventional iron catalyst reduces the reaction rate of ammonia synthesis, and therefore requires a larger amount of the catalyst, but use of the ruthenium catalyst does not reduce the synthesis rate, and requires a smaller catalyst amount than the iron catalyst.

Table 1 indicates comparison between the present invention and a conventional example.

The present invention uses the coolant 15 or the air 21. Therefore, the cooling temperature of the synthetic gas 14A after cooling, introduced into the ammonia separator 17 is from 30 to 50° C. On the other hand, the conventional example uses a chiller refrigerant, and therefore the cooling temperature is 10° C. or lower.

In the present invention, an inlet $NH_3$ concentration (mol %) of the ammonia synthesis column (reactor) 13 was 10 mol % because of a large amount of return ammonia gas.

On the other hand, in the conventional example, an inlet $NH_3$ concentration (mol %) of the ammonia synthesis column (reactor) 13 was 5 mol % because of a small amount of return ammonia gas.

Outlet $NH_3$ concentrations (mol %) of the ammonia synthesis column (reactor) 13 in the present invention and the conventional example were 25 mol % and 20 mol %, respectively.

Therefore, as a ratio of a synthesis system circulation amount, when the amount in the conventional example is assumed to be 1, the amount in the present invention is 1.2.

TABLE 1

|  | Present invention | Conventional example |
| --- | --- | --- |
| Cooling temperature (° C.) | 30 to 50 | 10° C. or lower |
| Inlet $NH_3$ concentration of reactor (mol %) | 10 | 5 |
| Outlet $NH_3$ concentration of reactor (mol %) | 25 | 20 |
| Synthesis system circulation amount (ratio when the amount in the conventional example is assumed to be 1) | 1.2 | 1 |
| Catalyst | Ru catalyst | Iron catalyst |

The results in Table 1 indicate the following. That is, in the present invention, a ratio of the ammonia gas in the return raw material is large, but reactivity is improved by using a ruthenium (Ru) catalyst as an ammonia synthesis catalyst used in the ammonia synthesis column 13, and therefore it is possible to suppress large increase in the amount of catalyst required for synthesis by using an iron catalyst.

This averts increase in cost of an ammonia synthesis plant as in the case of using an iron catalyst even when a raw material gas is water-cooled or air-cooled without using a chiller refrigerant in an ammonia synthesis process.

Next, a function of the ammonia synthesis system configured by the above will be described.

First, the raw material gas (hydrogen ($H_2$) and nitrogen ($N_2$)) 11 for ammonia synthesis is introduced into the ammonia synthesis column 13. During operation, the return raw material gas 11B which has been returned by the raw material return line $L_{12}$ is introduced. The synthetic gas 14 containing the ammonia gas 12A synthesized in the ammonia synthesis column 13 and the unreacted raw material gas 11A is cooled to about 30 to 50° C. by the water-cooled cooler 16 with the coolant 15, disposed in the discharge line $L_{11}$. The synthetic gas 14A after cooling is introduced into the ammonia separator 17, and the ammonia gas 12A and the liquid ammonia 12B are separated from each other here. The separated liquid ammonia 12B is recovered as a product ammonia.

Meanwhile, the raw material gas containing the ammonia gas 12A separated by the ammonia separator 17 is returned to the ammonia synthesis column 13 as the return raw material gas 11B by the raw material return line $L_{12}$, and ammonia synthesis is performed again here.

The return raw material gas 11B is compressed to a predetermined synthesis pressure by the compressor 18 disposed in the raw material return line $L_{12}$.

In the present example, the synthetic gas 14 is cooled by the water-cooled cooler 16 or the air-cooled cooler 22. Therefore, the ammonia concentration in the return raw material gas 11B returned to the ammonia synthesis column 13 is as high as 5 mol % or more, but a ruthenium catalyst is used as an ammonia synthesis catalyst that synthesizes the ammonia gas 12A in the ammonia synthesis column 13, and therefore the reaction activity is improved.

The raw material gas 11 is introduced into the raw material return line $L_{12}$ prior to the compressor 18 as a make-up gas through the make-up gas line $L_{14}$ to be mixed with the return raw material gas 11B, as needed, so as to obtain a predetermined synthesis concentration in the ammonia synthesis column 13.

The ammonia synthesis method of the present invention includes the following ammonia synthesis loop steps.

A first step is an ammonia synthesis step of synthesizing the ammonia gas 12A from the raw material gas (hydrogen and nitrogen) 11 for ammonia synthesis.

A second step is a water-cooled or air-cooled cooling step of cooling the synthetic gas 14 containing the obtained ammonia gas 12A and the unreacted raw material gas 11 with the coolant 15 or the air 21.

A third step is an ammonia separation step of separating the synthetic gas 14A after water-cooling is separated into the ammonia gas 12A and the liquid ammonia 12B.

A fourth step is a compression step of compressing the return raw material gas 11B when the raw material gas containing the separated ammonia gas 12A is returned to the ammonia synthesis step side as the return raw material gas 11B.

In the ammonia synthesis step of the first step in circulation, the ammonia concentration in the return raw material gas 11B to be introduced is 5 mol % or more, and a ruthenium catalyst is used as an ammonia synthesis catalyst that synthesizes the ammonia gas 12A. Therefore, even when the temperature of the synthetic gas 14A after cooling in the water-cooled or air-cooled cooling step of the second step is from 30 to 50° C., much higher than the conventional temperature of 10° C. or lower, it is possible to reduce refrigerant manufacturing cost without using a product ammonia as a chiller refrigerant and to improve an operating efficiency of ammonia synthesis.

REFERENCE SIGNS LIST 10A, 10B ammonia synthesis system
11 raw material gas
11A unreacted raw material gas
11B return raw material gas
12A ammonia gas
12B liquid ammonia
13 ammonia synthesis column
14 synthetic gas
15 coolant
16 water-cooled cooler
17 ammonia separator
18, 20 compressor
21 air
22 air-cooled cooler

The invention claimed is:

1. An ammonia synthesis method comprising:
an ammonia synthesis step of synthesizing an ammonia gas from a raw material gas for ammonia synthesis;
a water-cooled or air-cooled cooling step of water-cooling or air-cooling a synthetic gas containing the obtained ammonia gas and an unreacted raw material gas without using a product ammonia as a chiller refrigerant;
an ammonia separation step of separating the synthetic gas after cooling into the ammonia gas and a liquid ammonia; and
a compression step of compressing a return raw material gas when the raw material gas containing the separated ammonia gas is returned to the ammonia synthesis step side as the return raw material gas, wherein
an ammonia concentration in the return raw material gas to be introduced into the ammonia synthesis step is 5 mol % or more, and an ammonia synthesis catalyst that synthesizes the ammonia gas is a ruthenium catalyst, and
the temperature of the synthetic gas after cooling, to be introduced in the ammonia separation step is from 30 to 50° C.

2. An ammonia synthesis method according to claim 1, wherein the ammonia concentration in the return raw material gas to be introduced into the ammonia synthesis step is 10 mol %.

* * * * *